July 9, 1963 A. W. MILLS 3,096,707
FOOD HOLDING AND TURNING APPARATUS
Filed July 10, 1961
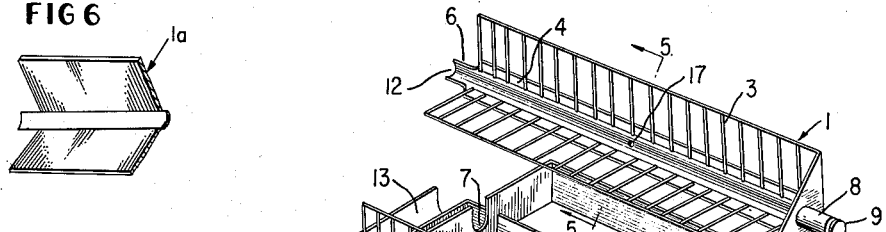
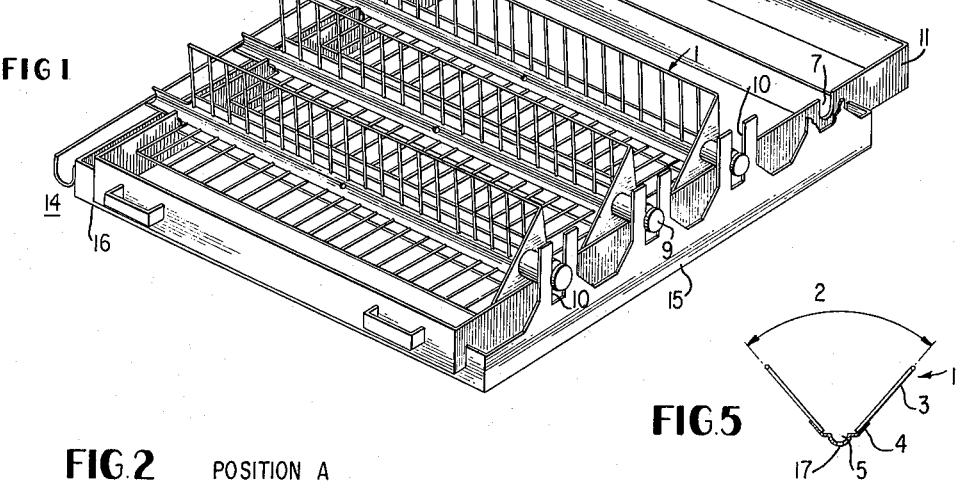
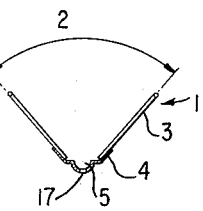
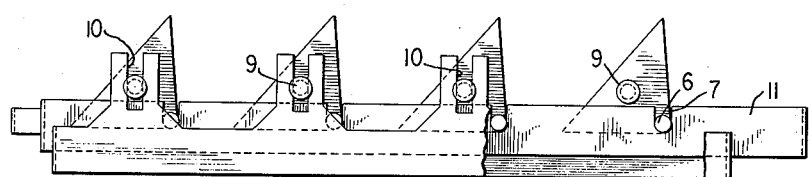
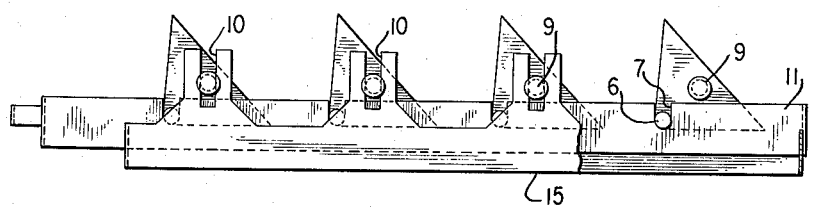
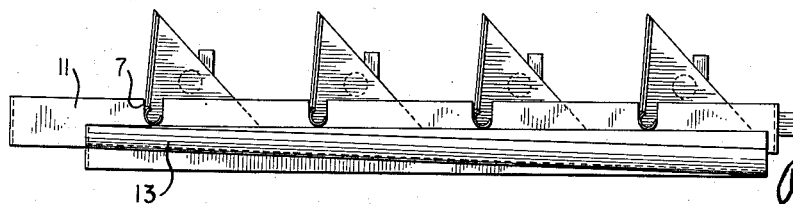
INVENTOR.
Archie W. Mills
ATTORNEY United States Patent Office
3,096,707
Patented July 9, 1963

3,096,707
FOOD HOLDING AND TURNING APPARATUS
Archie W. Mills, 345 E. 89th Place, Chicago, Ill.
Filed July 10, 1961, Ser. No. 122,679
5 Claims. (Cl. 99—423)

In the general practice of cooking barbequed foods, the meat is placed on a simple grated frame, and when turning is desired a large fork is used to stick the meat and hold it up in the air until it is possible to lay it over on the other side. Another means is to place the meat upon a spit or spike which turns in a number of patterns, thereby exposing all sides of the meat to the flame either from above, or to the side, or from below.

The former type machine requires close attention, regular turning by hand, and skilled operators. The latter type machine is limited in operation, cumbersome in construction, difficult to load and unload, and limited in its application in the turning of food being cooked.

This invention relates to a barbeque machine and has as an object the elimination of certain disadvantages in the machines mentioned above, thereby making the entire process a very simple operation.

The invention relates to a barbeque machine which when equipped with a motor of sufficient power and supplied with electrical current has an object to provide mechanical means for automatically turning over at regulated intervals, from one side to the other meat or other food that they may be placed on it to be cooked.

The invention has as an object to provide manual means for turning over at regulated intervals, from side to side meat or other food they may be placed on it to be cooked.

Another object is to provide means to control the amount of grease or drippings that will fall into the fire when an open source of heat such as charcoal, or heat of a similar character is used.

Another object is to provide for the salvage from the meat or food being cooked any amount of grease or drippings that is not needed on the open fire for the purpose of generating a desired amount of smoke in the barbeque or open flame process of cooking.

Another object is to provide means of loading and unloading meat or other food onto the racks with a minimum of effort.

Another object is to provide complete access to the product during the cooking process for the purpose of inspection, basting and seasoning.

Another object of this machine is to control the fire hazard in open flame cooking by controlling the amount of grease and drippings that will fall into the open fire.

Another object of this machine is to provide an attractive display of open flame cooking and to attract attention to the open flame method of cooking employed in a particular establishment.

Another object is to provide a manual or mechanical means of turning over any item that is to be cooked on any kind of a stove.

Other objects of this invention will manifest themselves as the description progresses, reference being made to the accompanying drawings wherein FIGURE 1 is a perspective view of an embodiment of my invention.

FIGURE 2 is a side view of said embodiment showing racks in position A.

FIGURE 3 is a side view of said embodiment showing racks in position B.

FIGURE 4 is a side view of said embodiment showing a grease collecting feature.

FIGURE 5 is a cross section view of rack showing the construction of trough and grease passage.

FIGURE 6 is a fragmentary perspective view showing a solid rack construction according to the invention.

The machine consists of single or multiple removable, substantially V shaped racks 1, size to accommodate and contain the meat cuts. The angle 2, is 80 degrees approximately.

At the central bottom of each rack is a sloping trough 4, extending upwardly on either side to attach integrally with the wire cooking pan area 3. This trough 4, contains a groove 5, for the passage of grease or residue and extends the length of the trough. One end of this trough extends beyond the cooking area 3, and is formed into a hollow axle 6, and a lip or spout 12. The other end of the trough extends beyond the cooking area 3, to form a simple closed axle 6 as shown in FIG. 2. Directly above this latter axle is constructed an extended axle 8, and a retaining head 9.

The V shaped racks described are placed onto a set of two rectangular frames. Frame 11, contains bearings 7, appropriately placed to receive axles 6, on the lower point of the racks 1, and designed to move from side to side as shown in the two drawings, FIG. 2, showing frame 11, in position A, and FIG. 3, showing frame 11, in position B.

The extended axle 8, held by retaining head 9, is made to fit into grooved bearing 10, contained in the second rectangular frame 15, which is stationary. Therefore when the rack or racks are properly set on frame 11, which is moveable, and anchored at the top by axle 8, in slotted bearings 10, on frame 15, which is stationary, the movement of frame 11, from a right hand position FIG. 2, position A, to a left hand position FIG. 3, position B, will cause the rack or racks to make an approximately one-quarter turn, and anything already placed on them to be cooked will be raised from a horizontal position to a vertical position and beyond and because of its own weight will fall to the other side of the rack or racks and thereby be turned over for cooking on the other side.

The machine is tilted slightly towards the grease collecting gutter 13, and in the turning operation of the rack or racks from one side to the other any grease or residue from the cooking will tend to move down to the trough 4, collect in groove 5, move out through open axle 6, over spout 12, and into gutter 13, to be collected in a receptacle at point 14.

Discharge hole 17, located in the central bottom of the rack will allow a desired amount of the grease or residue so collected to fall into the open fire for the purpose of generating a desired amount of smoke. Situated in the center lengthwise, it will allow fifty percent (50%) of all grease or drippings to go into the fire. By moving it either way or by increasing the number of such holes, the amount of grease to be dropped on the fire can be controlled.

In cases where open flame methods of cooking are not employed, racks can be made of solid material, as seen in FIGURE 6 at 1a, and hole 17, eliminated, but all of the other features to be retained.

Lower bearing frame 11, may be moved from side to side manually or by a motor that can be timed to operate the frame continually or intermittently as desired.

Automation in cooking is possible from the moment of placing the item in the machine. A concise and specific description of the process is as follows:

Open flame or other heat is applied to meat or other food cut to proper size and placed on the rack or racks. As the meat or other food is cooked on one side and it becomes necessary to cook the other side, the machine is activated mechanically or manually and the rack or racks at a reasonable speed makes an approximately one-quarter turn. This turning operation causes the meat or other food to be raised from a horizontal position to a position beyond that of perpendicular, which results in the falling of the meat or other food, by its own weight to the opposite side of the rack or racks, where it is exposed to the same source of heat for cooking on its other side. This operation, which can be regulated with a timer, is repeated at intervals until the meat or other food is done.

What is claimed is:

1. A machine for cooking meat and other food over an open fire or flame which comprises a frame, a plurality of elongated spaced parallel V-shaped racks spanning said frame and pivotally mounted at their ends on said frame, each of said racks having a pair of food supporting legs diverging from an apex, a trough at the apex of each rack extending along the entire length of the rack and positioned to receive grease draining from food supported on either leg of the rack, and means for simultaneously pivoting said racks sufficiently to shift food supported on one leg of the rack to the other leg of the rack thereby selectively exposing the food to a fire or flame underneath the frame.

2. In a machine for cooking meat and other food over an open flame or fire, a frame, a plurality of V-shaped racks spanning said frame and pivotally mounted at their ends on said frame to rotate about the apex thereof, each rack having opposed food supporting legs diverging from the apex thereof, a trough extending along the apex of each rack to receive drippings from food supported on either leg of the rack, means for draining said troughs beyond said frame, means for bleeding some of the drippings from said troughs within the confines of the frame to drain onto the open flame or fire below the frame for creating smoke to impart a desired flavor to the food, and means for simultaneously rotating said racks about their pivots to alternately deposit food on the opposed legs of said racks and thereby alternately and selectively expose the opposite sides of the food to the open flame or fire.

3. In a barbecue grill or the like, a rectangular frame adapted to be mounted over a bed of coals, a plurality of substantially V-shaped racks spanning said frame in spaced parallel relation and pivotally mounted on said frame at the ends thereof for rotation about the apex of each rack, each of said racks having food supporting legs diverging from said apex, a trough at the apex of each rack extending along the length of the rack for receiving food drippings from food on the legs of the rack, said troughs extending at one end thereof beyond said frame and being inclined to drain to the extended ends thereof beyond the frame and underlying bed of coals, and means for simultaneously rotating said racks about the apex pivots thereof for alternately depositing food on the diverging legs of the racks to thereby turn the food and alternately expose opposite sides of the food to the bed of coals.

4. Cooking apparatus comprising a generally V-shaped rack having a pair of opposed support surfaces configured to retain food to be cooked, means mounting the rack for pivotal movement about an axis adjacent the apex thereof, means for selectively pivoting the rack sufficient to deposit food successively on the opposed support surfaces so that the food can be cooked on both surfaces, and a trough formed at the apex of the V-shaped rack between said support surfaces and sloping in one direction along the longitudinal axis thereof to carry off drippings from food being cooked and supported on the support surfaces.

5. Cooking apparatus which comprises a generally V-shaped rack having a pair of opposed support surfaces for retaining food to be cooked, means mounting the rack for pivotal movement about a longitudinal axis adjacent the apex of the rack, means for selectively pivoting the rack about said axis sufficiently to alternately deposit the food on the opposed support surfaces and thereby expose opposite faces of the food to a bed of coals under the rack, a trough at the apex of the rack positioned to receive drippings from the food when supported on either support surface, said trough being inclined to drain drippings to one end of the rack, and said trough having an intermediate drainage portion for bleeding some of the drippings onto a bed of coals under the rack for creating smoke to impart a charcoal flavor to the food being cooked.

References Cited in the file of this patent

UNITED STATES PATENTS

| | | |
|---|---|---|
| 1,108,553 | Copeman | Aug. 25, 1914 |
| 1,397,852 | Bender | Nov. 22, 1921 |
| 1,986,524 | Perks et al. | Jan. 1, 1935 |
| 2,060,004 | Ebberts | Nov. 10, 1936 |
| 2,101,967 | Walterspiel | Dec. 14, 1937 |
| 2,198,134 | Spiegl | Apr. 23, 1940 |
| 2,469,595 | Foster | May 10, 1949 |
| 2,883,924 | Koser | Apr. 28, 1954 |
| 2,925,028 | Haynes | Feb. 16, 1960 |
| 2,969,012 | Steffel | Jan. 24, 1961 |